(12) United States Patent
Yahav

(10) Patent No.: US 6,260,474 B1
(45) Date of Patent: Jul. 17, 2001

(54) SEDIMENT COLLECTION

(75) Inventor: Shimon Yahav, Rehovot (IL)

(73) Assignee: Gotit, Ltd., Rehovot (IL)

( * ) Notice: Subject to any disclaimer, the term of this patent is extended or adjusted under 35 U.S.C. 154(b) by 0 days.

(21) Appl. No.: 09/423,620

(22) PCT Filed: Apr. 28, 1998

(86) PCT No.: PCT/IL98/00200

§ 371 Date: Jan. 18, 2000

§ 102(e) Date: Jan. 18, 2000

(87) PCT Pub. No.: WO98/51574

PCT Pub. Date: Nov. 19, 1998

(30) Foreign Application Priority Data

May 15, 1997 (IL) ......................................................... 120839

(51) Int. Cl.⁷ .............................. C12F 3/06; B65D 41/00; C12C 11/00

(52) U.S. Cl. .............................. 99/277.1; 426/8; 426/495; 426/11; 426/112; 215/6; 215/227; 211/77

(58) Field of Search ...................... 99/277.1, 277.2–277, 99/276; 429/11, 8, 62, 112, 115, 495; 215/227, 6; 220/215; 211/74, 77, 121

(56) References Cited

U.S. PATENT DOCUMENTS

| | | |
|---|---|---|
| 463,421 | 11/1891 | Gerbel . |
| 1,293,410 | 2/1919 | Goodwin . |
| 2,056,014 | 9/1936 | Moore et al. . |
| 2,584,183 | 2/1952 | Blumauer et al. . |
| 2,610,123 | 9/1952 | Bruyere et al. . |
| 2,936,901 * | 5/1960 | Siemantel ............................ 211/77 |
| 3,062,656 | 11/1962 | Agabalianz et al. . |
| 3,112,201 | 11/1963 | Saez . |
| 3,413,128 | 11/1968 | Steinbarth et al. . |
| 3,545,978 | 12/1970 | Agabaliants et al. . |
| 3,856,169 | 12/1974 | Wilson et al. . |
| 3,867,550 | 2/1975 | Taylor . |
| 3,875,008 | 4/1975 | Yoshino et al. . |
| 3,881,021 | 4/1975 | Merzhanian et al. . |
| 3,944,104 | 3/1976 | Watson et al. . |
| 4,009,285 | 2/1977 | Spooner . |
| 4,076,142 | 2/1978 | Naz . |
| 4,265,914 | 5/1981 | Sarishvili et al. . |
| 4,460,608 | 7/1984 | Charmat . |
| 4,473,174 | 9/1984 | Heuser . |
| 4,524,680 | 6/1985 | Jeanrat et al. . |
| 4,612,849 | 9/1986 | Konischev et al. . |
| 4,612,949 | 9/1986 | Henson . |
| 4,650,083 | 3/1987 | Lembeck . |
| 4,687,115 | 8/1987 | Bongiovanni . |
| 4,767,167 | 8/1988 | Jeffries . |
| 4,792,454 | 12/1988 | Lemonnier . |
| 4,841,848 | 6/1989 | Baker et al. . |
| 4,842,869 | 6/1989 | Forino . |
| 4,932,543 | 6/1990 | Martus . |
| 4,947,737 | 8/1990 | Gladstone . |
| 4,948,598 | 8/1990 | Lembke et al. . |
| 4,981,700 | 1/1991 | Sarischvili et al. . |
| 5,019,410 | 5/1991 | Pors et al. . |
| 5,104,665 | 4/1992 | Fleet et al. . |
| 5,413,925 | 5/1995 | Lemonnier . |
| 5,614,236 | 3/1997 | Klang . |
| 5,718,349 * | 2/1998 | Bernar et al. ................. 99/277.1 X |

* cited by examiner

Primary Examiner—Reginald L. Alexander
(74) Attorney, Agent, or Firm—Greenblum & Bernstein, P.L.C.

(57) ABSTRACT

A stopper including a collection receptacle, characterized in that the stopper is provided with a valve that permits flow of sediments into said collection receptacle, wherein the valve may be closed to substantially trap the sediments in the collection receptacle and obstruct flow therefrom.

40 Claims, 16 Drawing Sheets

SEDIMENT COLLECTION

REFERENCE TO CO-PENDING APPLICATIONS

This application is a national phase application of PCT Patent Application PCT/IL98/00200, filed Apr. 28, 1998, which was published in English, and claiming priority from Isreal Patent Application No. 120839, filed May 15, 1997.

FIELD OF THE INVENTION

The present invention relates to stoppers for collecting therein sediments formed during fermentation of effervescent beverages, to methods for entrapping sediments in the stopper, and to uses of the stoppper in producing effervescent beverages of all sorts.

BACKGROUND OF THE INVENTION

Wine is the fermented juice of grapes, although the term is also commonly used in conjunction with other fruits of the earth, such as barley wine, apple wine and ginger wine, for example. Fermentation of grapes is a natural phenomenon due to the catalytic action of the zymase of living microorganisms or ferments known as Saccharomycetes which are present on the skins of ripe grapes. Saccharomycetes are the natural yeast that make it possible for grape sugar ($C_6H_{12}O_6$) to ferment into carbon dioxide ($CO_2$) and ethyl alcohol ($C_2H_6O$). There are various by-products of fermentation which vary according to the chemical composition of the must, and in accordance with the rate and manner of fermentation. These by-products either dissolve in the wine or precipitate as sediments.

Wine is generally fermented in vats or barrels before bottling in consumer bottles. Sparkling wines and similar beverages are generally produced by methods which may be divided into two principal groups The classical method is carried out by bottling wine before the fermentation has been completed and allowing the wine to finish fermentation, or to undergo a second fermentation, in the bottle. By this method champagne or a similar beverage of highest quality is produced but the method is extremely troublesome and highly expensive. During fermentation in the bottle, grape sugar and/or sugar added to the wine is converted into alcohol and carbon dioxide, and the presence of the latter causes a relatively high pressure, for example, up to 12 atmospheres and greater, to be built up in the hermetically closed bottle. A danger of explosion constitutes a very serious problem in handling these bottles.

Besides the alcohol and $CO_2$ production, sediments are also produced during fermentation in the bottle, and these must be removed before the champagne or other beverage may be sold and consumed. The removal of these sediments constitutes a major problem. Generally the bottles must be periodically shaken in order to prevent the sediments from adhering to the inner walls of the bottle. During shaking, the danger of explosions is particularly great and skilled labor has to be employed in order that the operation be properly executed. In order to remove the sediments from the bottle they are first collected upon the inside face of the cork of the bottle, whereafter the liquid in the neck of the bottle is frozen into solid state and finally the cork and the small block of ice containing the sediments are blown off with the aid of the gas pressure within the bottle. In order to avoid loss of liquid, immediately after removal of the sediments, the bottle must be hermetically closed again. In this step, as in the previous ones, great skill is required and, apart from the accidents that are liable to happen, losses of valuable liquid cannot be avoided in the period between the uncorking and the new sealing of the bottles. Typically liqueur, brandy and/or sugar are added to the wine to compensate for the wine lost during the removal of the frozen matter.

In order to overcome the aforementioned difficulties, many manufacturers of sparkling wines developed another method of producing such beverages. In this method, the wine concludes fermentation or undergoes a second fermentation not in bottles but in large sealed vats or containers. However, this method produces inferior quality beverages, and still does not solve the problem of removing dregs without removing the $CO_2$ gas which contributes to the taste and bouquet of the wine. Indeed, collection and removal of sediments still poses a problem, even in the production of lesser quality effervescent beverages, such as "industrial" quality wines that are produced in bulk and continuous flow tanks. Filtering of the sediments is costly and there are generally detrimental effects to the taste and bouquet of the wine.

Manufacturers over the years have tried different filtration methods to discard the dregs while retaining sufficient $CO_2$ needed to impart a desired level of effervescence. Some filtration methods, used especially for bottle-fermented wines, include placing a porous filter bag containing yeast into the wine. Dregs produced by the yeast-induced fermentation of the wine are generally confined in the yeast-holding filter bag, and are prevented from circulating in the wine. However, these filtration methods suffer from several problems. One problem with filter bags is that they prevent the 'confined' yeast from circulating in the wine, and thereby limit the fermentation volumetric zone and lengthen fermentation time. Another problem faced by some filter-bag methods is that it is difficult to prevent the dregs from stopping up the pores of the bag, thereby retarding or adversely affecting the fermentation. Moreover, the taste of the wine may be adversely affected by the containment of the beneficial by-products of the fermentation inside the filter bag. Other problems, inter alia, include insufficient circulation of the yeast in the quantity of wine being fermented, a risk of breakage of the filter bag, continual need to remove the filter bag, and, as mentioned previously, the need to add materials to make up for losses occured during pressure release, and to restop the bottle.

The following United States Patents are believed to be representative of the prior art: U.S. Pat. Nos. 463,421 to Gerbel, 2,610,123 to Bruyere et al., 3,062,656 to Agablianz et al., 3,112,201 to Saez, 3,545,978 to Agabliants (sic) et al., 3,867,550 to Taylor, 3,875,008 to Yoshino et al., 3,881,021 to Merzhanian et al., 3,944,104 to Watson et al., 4,009,285 to Spooner, 4,076,142 to Naz, 4,265,914 to Sarashvili et al., 4,460,608 to Charmat, 4,612,949 to Konischev et al., 4,650,083 to Lembeck, 4,792,454 to Lemonnier, 4,842,869 to Forino, 4,948,598 to Lembke et al., 4,981,700 to Sarashvili et al., 5,019,410 to Pors et al., 5,104,665 to Fleet et al., and 5,413,925 to Lemonnier.

SUMMARY OF THE INVENTION

The present invention seeks to provide novel methods for entrapping sediments in the production of effervescent beverages and especially novel stoppers to collect and trap sediments produced during fermentation of effervescent beverages in a bottle or other fermenting chamber. The stopper permits vintners to effect improvements and savings in the entire processes of wine and champagne making. In particular, in accordance with a preferred embodiment, the stopper may remain on a bottle in which the effervescent beverage has been fermented until opened by a consumer, in which case many of the traditional stopper-changing and topping-up steps of the art of champagne making can be entirely eliminated or significantly altered.

The stoppers of the present invention include a valve which allows sediments to flow into a collection receptacle in the stopper. Once the sediments have been collected in the receptacle, the valve is closed, thereby trapping the sediments in the receptacle in which they can remained sealed or from which they may be later removed.

It is noted that throughout the specification and claims the terms "effervescent beverage", "fermented beverage", "wine" and "champagne" are used interchangeably and encompass not only wine and champagne but also any kind of fermented beverage, including ciders, ales and beers, produced from any type of grain, fruit, legume or vegetable, for example.

It is also noted that the present invention is clearly distinguished from the filter bags of the prior art. As mentioned above, the filter bags of the prior art confine sediments produced by the yeast-induced fermentation of the wine, thereby preventing the yeast and sediments from circulating in the wine. In contrast, the stopper of the present invention does not in any way inhibit the fermentation and circulation of yeast and sediments in the fermenting beverage, but rather collects and separates the free-circulating sediments formed as a by-product of the fermentation process.

The stopper of the present invention has numerous advantages over the prior art:

1. The stopper greatly reduces the time-consuming and labor-expensive process used currently in the art. Once the sediments are trapped inside the stopper, the entire process of removing sediments from the wine is finished and the champagne is ready for further aging, or immediate shipping and/or consumer use. Of course, the vintner is still free to remove and replace the stopper, without freezing, and to add liqueur or other additives in the traditional manner.
2. The stopper may be inexpensively manufactured and implemented.
3. In the production of fortified wines or other effervescent beverages with a high gas pressure build-up, the stopper may be provided with a pressure relief device, if desired, to reduce the need for the typical robust champagne bottle which must withstand 25 atmospheres of pressure. With a relief valve, 15 atmosphere bottles may be used, thereby reducing the cost, weight and shipping cost of the bottle.
4. The stopper may be fashioned for one time or multiple use.
5. Since there is no extraction of a frozen portion of liquid, the amount of beverage loss is greatly reduced, thereby providing vintners greater options of adding, or not adding at all, traditional additives.
6. The stopper may be readily used to produce do-it-yourself or home-brewed beverages, wherein the beverage is held and/or tilted in a stand until the beverage has reached a desired effervescence and sediments have been collected in the stopper.
7. The stopper may be fashioned with a sealable spout to allow pouring contents from the bottle while the stopper is still attached thereto.
8. The stopper may obviate the need for clarifying the beverage before bottling, because dregs and sediments are collected in the stopper.
9. Because the stopper can remain on the bottle from the beginning of fermentation of the juice to opening of the champagne by the consumer, many steps in the methods of making traditional and "industnal" quality champagne may be eliminated altogether, and other steps may be combined or re-ordered.
10. The stopper may improve and shorten many steps used in making regular wine and in turning wine into champagne. The wine and/or champagne can be bottled at an early stage, and the use of the stopper permits the vintner to skip or shorten separate stages of clarifying and decanting regular wine in separate facilities, and allows the champagner to eliminate or alter freezing, plug removal, topping-up, and recapping stages.

Many of these other steps (that can be so eliminated or combined) may traditionally require special facilities, equipment and skilled staff, so that in practice most, if not all, the traditional steps are normally carried out at the winery, in expensive-to-maintain storage areas and other areas for transferring the product between, e.g., the clarifying tank and the decanting tank; or from the shaking cavern to the freezing room to the topping-off and recapping room.

In contrast, closing the valve of the stopper to entrap the dregs is a simpler task, making the method of the present invention suitable for do-it-yourself types, as well as affording commercial vintners an opportunity to ship the bottles at an early stage and carry out the valve closing at a remote location.

The stopper of the present invention may be used in a variety of methods for production, handling or treatment of beverages. For example, some of the uses of the stopper are:

1. The stopper may be used to decant all kinds of effervescent and non-effervescent beverages, thereby eliminating conventional decanting tanks.
2. The stopper may be used to collect sediments and dregs during transportation of "industrial" quality sparkling wines, such as by truck or ship, from a bottling plant, wherein the collected sediments are removed at a distribution depot. Indeed, the stopper allows the traditional step of riddling to be performed during transportation of the beverage if desired, thereby saving on expensive storage costs.
3. The stopper may be used in bottles, tanks, and various other kinds of containers in which fermentation, or secondary fermenation, occurs.

There is thus provided in accordance with a preferred embodiment of the present invention, sediment collecting apparatus including a stopper sealably attachable to a bottle, and a collection receptacle formed in the stopper, characterized in that the stopper is provided with a valve that permits flow of a fluid containing sediments from the bottle into the collection receptacle, wherein the valve may be closed to substantially trap the sediments in the collection receptacle and obstruct flow therefrom to the bottle.

In accordance with a preferred embodiment of the present invention, a retaining mechanism is provided for releasably retaining the valve in an open configuration that permits the flow of the fluid containing sediments into the collection receptacle.

Additionally in accordance with a preferred embodiment of the present invention, a pressure relief device is provided that relieves an internal pressure of the bottle.

Further in accordance with a preferred embodiment of the present invention, the valve is selectively returnable from a closed configuration that substantially traps the sediments in the collection receptacle and obstructs flow therefrom to the bottle, to an open configuration that permits the flow of the fluid containing sediments from the bottle into the collection receptacle.

Still further in accordance with a preferred embodiment of the present invention, an expelling device is provided for expelling sediments from the collection receptacle. Preferably, the expelling device expels sediments from the collection receptacle while the stopper is attached to the bottle.

Still further in accordance with a preferred embodiment of the present invention, a stem extends from the receptacle and is adapted to sealingly fit into an aperture of the bottle, the stem having a bore to permit fluid communication between the contents of the bottle and the receptacle.

In accordance with a preferred embodiment of the present invention, the valve includes a plunger that biases against a valve seat in the stem. Preferably the stem includes a packing preform for sealing the stem with respect to the aperture of the bottle. A packing preform is any kind of seal, e.g., an O-ring, such as for sealing passage of fluids through an opening.

Additionally in accordance with a preferred embodiment of the present invention, the valve includes another internal valve for selective passage of substances therethrough. A spout may be provided, wherein the internal valve is in fluid communication with the spout and with the bottle, and wherein the internal valve may be selectively opened to pour therethrough a beverage from the bottle.

Further in accordance with a preferred embodiment of the present invention, the collection receptacle includes a flexible portion which may be sealed by twisting thereof Still further in accordance with a preferred embodiment of the present invention, the valve includes a device which prevents further use of the valve once the valve has been closed to trap sediments therein.

In accordance with a preferred embodiment of the present invention, the collection receptacle includes a portion with a changeable volume and a volumetric change of this portion causes closure of the valve. For example, the portion may be an expandable portion which upon expansion closes the valve.

Additionally in accordance with a preferred embodiment of the present invention, the valve is opened by a pressure of fluid pressing thereagainst.

Further in accordance with a preferred embodiment of the present invention, the valve is closed by a pressure of fluid pressing thereagainst.

Still further in accordance with a preferred embodiment of the present invention, the valve is biased by a biasing device against a pressure exerted thereupon by a fluid, and the valve may be selectively opened to permit an ingress of the fluid that presses against the valve into the collection receptacle.

There is also provided in accordance with a preferred embodiment of the present invention, a method for producing a beverage including sealing a fermentable beverage in a container with a stopper, the stopper being formed with a collection receptacle therein, fermenting the fermentable beverage, thereby producing sediments as a by-product of the fermenting, allowing the sediments to flow into the collection receptacle, and trapping the sediments in the collection receptacle so as to separate the sediments from a portion of the beverage remaining in the container outside of the collection receptacle.

There is also provided in accordance with a preferred embodiment of the present invention, a method for separating fermentation-produced sediments from a portion of a fermenting beverage, the method including allowing the beverage with the sediments to flow into a collection receptacle formed in a stopper that seals a container containing the beverage, and trapping the sediments in the collection receptacle so as to separate the sediments from a portion of the beverage remaining in the container outside of the collection receptacle.

The method may also include allowing the beverage to undergo primary and secondary fermentation, wherein the container is sealed with the stopper during both primary fermentation and secondary fermentation.

Preferably the container is pressure relieved upon an internal pressure of the container reaching a predetermined level, e.g., in the range of about 12–25 atmospheres.

In accordance with a preferred embodiment of the present invention, a substance is added to the portion of the beverage remaining in the container outside of the collection receptacle. The substance may be added between primary and secondary fermentation.

Additionally in accordance with a preferred embodiment of the present invention, the method includes riddling the container while allowing the sediments produced by the fermenting to flow into the collection receptacle.

Further in accordance with a preferred embodiment of the present invention, the trapping of the sediments is performed after transporting the container to a location remote from where the beverage was placed in the container.

There is also provided in accordance with a preferred embodiment of the present invention, apparatus for manipulating a beverage container, including a drum having a longitudinal axis and arranged for rotation on a supporting base, the drum having an aperture formed therein for receiving therein a portion of a beverage container, at least one end of the drum being formed with a plurality of teeth which selectively engage a catch located on the supporting base, wherein the catch may be selectively released from the teeth to permit the drum to be rotated generally about the longitudinal axis.

BRIEF DESCRIPTION OF THE DRAWINGS

The present invention will be understood and appreciated more filly from the following detailed description, taken in conjunction with the drawings in which:

FIGS. 3–6 are simplified pictorial illustrations of a method for separating fermentation-produced sediments from a portion of a fermenting beverage, in accordance with a preferred embodiment of the present invention, wherein:

FIG. 3 illustrates inverting the bottle with the stopper of FIG. 1 sealingly fitted thereto;

FIG. 4 illustrates the sediments being collected in a collection receptacle of the stopper;

FIG. 5 illustrates trapping the collected sediments in the receptacle after completing collection of sediments in the receptacle; and FIG. 6 illustrates in greater detail the sediments trapped in the receptacle;

DETAILED DESCRIPTION OF A PREFERRED EMBODIMENT

Figure 1:
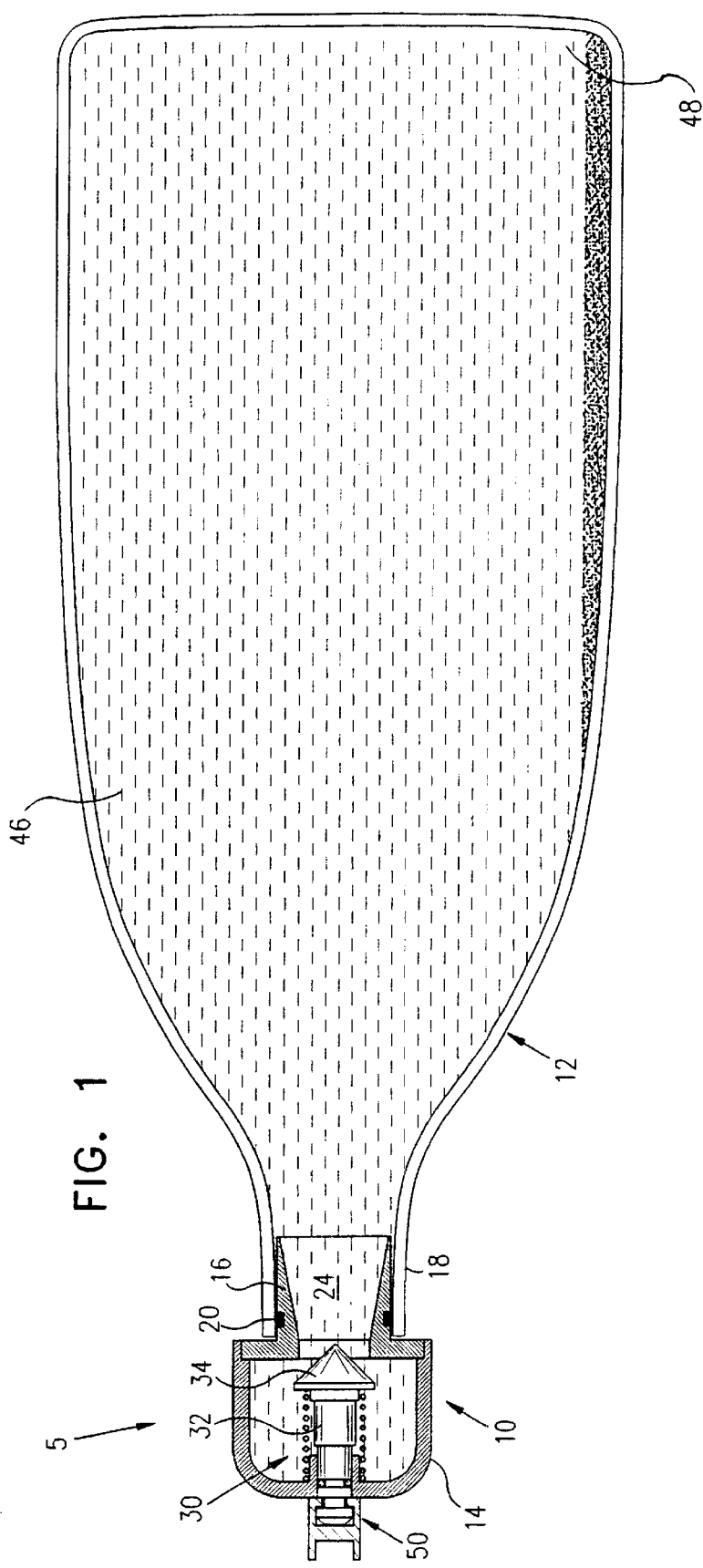
FIG. 1 is a simplified pictorial, partially sectional illustration of a container equipped with sediment collecting apparatus, constructed and operative in accordance with a preferred embodiment of the present invention.
Figure 2:
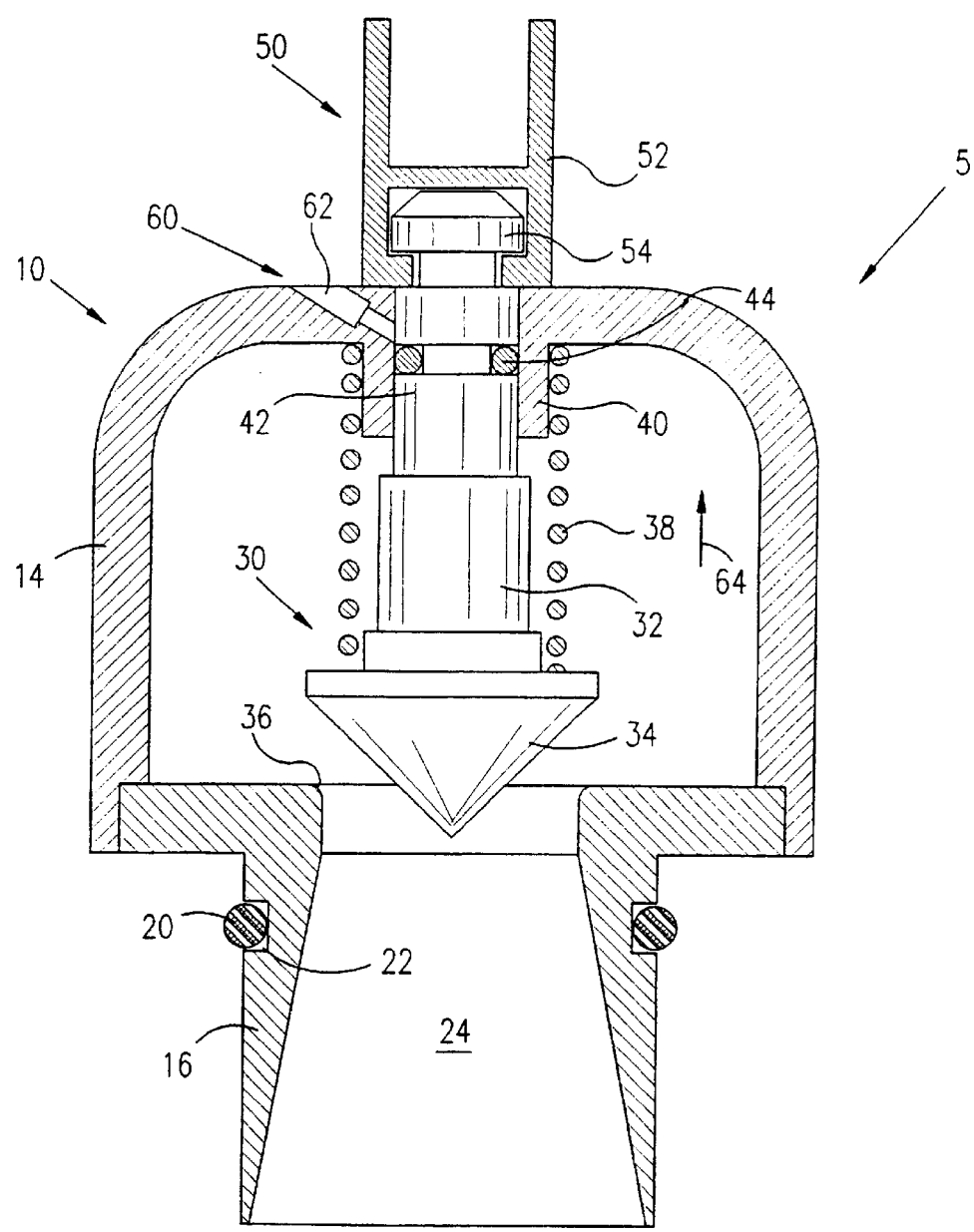
FIG. 2 is a more detailed partially sectional illustration of the sediment collecting apparatus of FIG. 1, constructed and operative in accordance with a preferred embodiment of the present invention.

Reference is now made to FIGS. 1 and 2 which illustrate sediment collecting apparatus 5, constructed and operative in accordance with a preferred embodiment of the present invention.

Sediment collecting apparatus 5 preferably includes a stopper 10 that may be sealably attached to a bottle 12. Stopper 10 may be fabricated from any durable material such as plastic, metal or cork, and may be transparent or opaque. Bottle 12 may be fabricated from materials such as glass, metal or plastic. It is appreciated that the present invention may be carried out with any container suitable for containing therein a beverage, such as a tank or metal container as well, and throughout the specification and the claims, the term "bottle" encompasses any such kind of container suitable for containing therein a beverage, and the terms are used interchangeably. Stopper 10 preferably has a collection receptacle 14 formed therein.

Stopper 10 preferably includes a stem 16 that extends from collection receptacle 14. Stem 16 is typically generally cylindrical in shape and adapted to sealingly fit into a neck 18 of bottle 12. Stem 16 is preferably sealed with respect to neck 18 by any conventional sealing device. For example, a packing preform, such as an O-ring 20, may be assembled on a groove 22 formed in stem 16 to ensure sealing engagement of stem 16 with respect to neck 18. Stem 16 preferably has a bore 24 to permit fluid communication between contents of bottle 12 and collection receptacle 14.

Stopper 10 is preferably provided with a valve 30 that, as will be described hereinbelow, permits flow of a fluid containing sediments from bottle 12 into collection receptacle 14, wherein valve 30 may be closed to substantially trap the collected sediments in collection receptacle 14 and obstruct flow therefrom to bottle 12. In accordance with one preferred embodiment of the present invention, valve 30 includes a biased plunger 32 disposed in collection receptacle 14 and formed with an end 34 which may sealingly seat against a valve seat 36 at an end of bore 24 in stem 16. End 34 is typically conical in shape, but it is appreciated that other shapes may also be used that sealingly seat against valve seat 36. Plunger 32 may be biased by any biasing device, such as a spring 38. Plunger 32 is preferably arranged for generally linear movement inside receptacle 14. Preferably receptacle 14 has an inwardly protruding sleeve 40 in which a shaft portion 42 of plunger 32 slides. Shaft portion 42 is eferably provided with an O-ring 44 so as to provide a substantially sealed interface between shaft portion 42 and sleeve 40.

FIGS. 1 and 2 illustrate valve 30 in an open configuration wherein contents of bottle 12, comprising a beverage 46, such as champagne, and sediments 48, may flow into receptacle 14. Preferably stopper 10 employs a retaining mechanism 50 to retain valve 30 in the open configuration. Retaining mechanism 50 may include a keeper 52 which engages with a knob 54 formed at an end of plunger 32 opposite to end 34. When keeper 52 is removed from knob 54, spring 38 is released, causing plunger 38 to force end 34 to sealingly seat against valve seat 36, thereby trapping collected sediments 48 inside receptacle 14. It is appreciated that keeper 52 is merely one example of retaining mechanism 50, and many variations are possible, such as a pin releasably fitted into a hole underneath knob 54.

As is known in the art, champagne bottles are usually rather robust, typically withstanding pressures up to approximately 25 atmospheres. As seen in FIG. 2, stopper 10 may be optionally provided with a pressure relief device 60, such as a diagonal bore 62. In the open configuration shown in FIG. 2, O-ring 44 is below bore 62 and no fluid can escape therethrough. Excess pressure formed inside bottle 12 may push against end 34 and, if of sufficient magnitude, may move end 34 against spring 38 in the direction of an arrow 64. If sufficient pressure causes plunger 32 to move in the direction of arrow 64 such that O-ring 44 is moved above bore 62, pressurized fluid is expelled through bore 62, thereby relieving the internal pressure formed in bottle 12. Alternatively, pressure relief device 60 may be located on any other portion of stopper 10 or bottle 12.

Reference is now made to FIGS. 3–6 which illustrate a method for separating fermentation-produced sediments 48 from a portion of beverage 46, in accordance with a preferred embodiment of the present invention.

Figure 3:
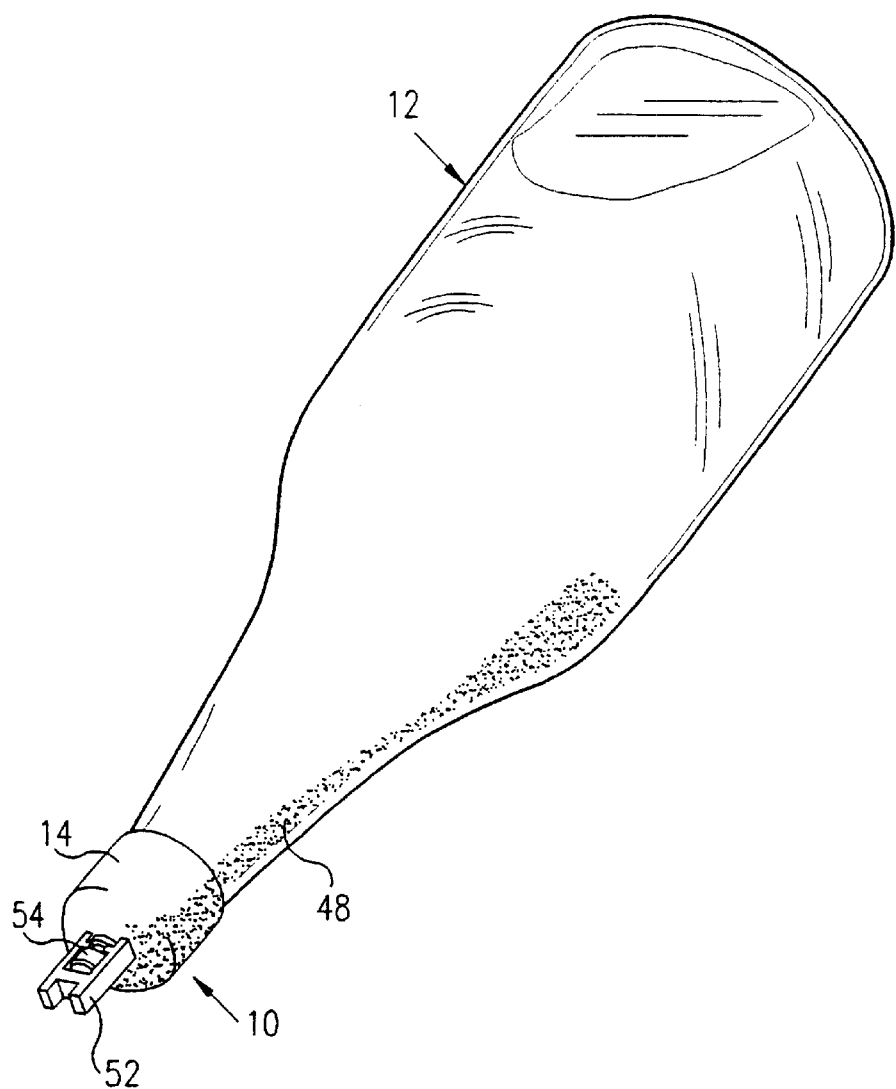
Figure 4:
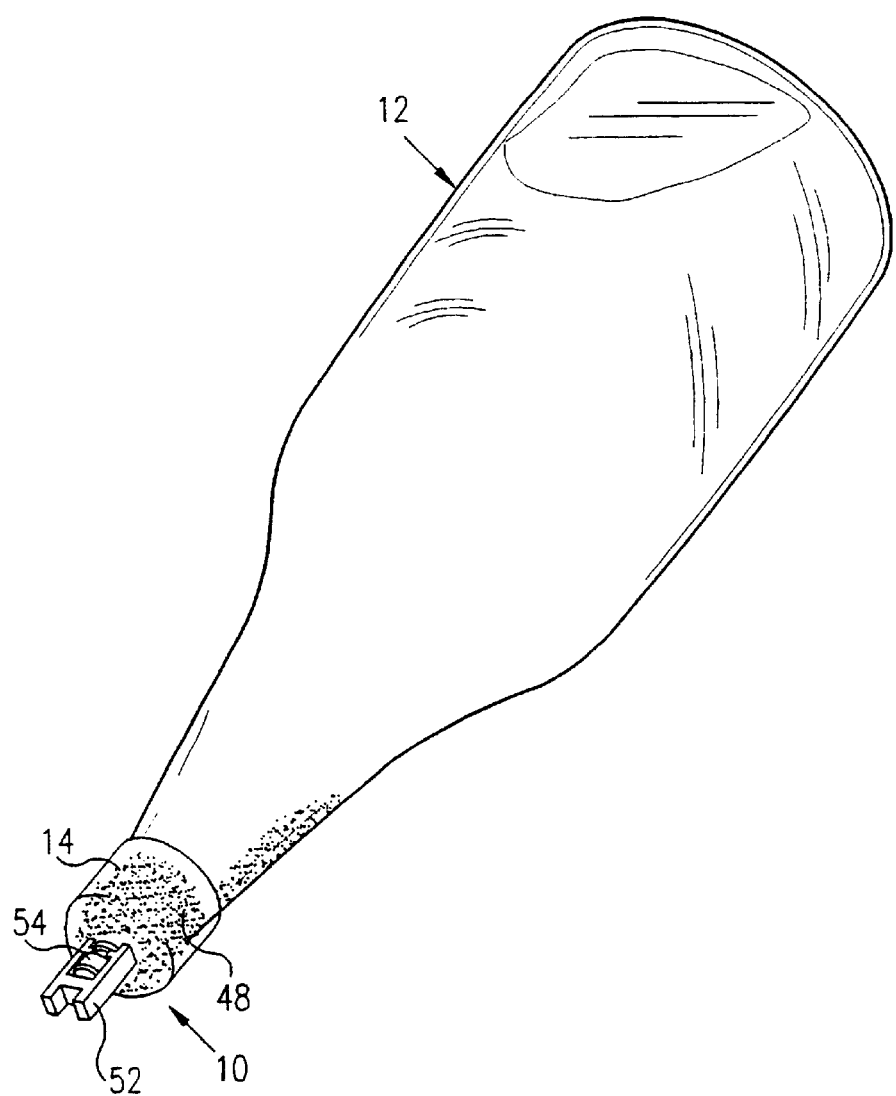

In FIG. 3, bottle 12, which is sealed by stopper 10, is inverted and sediments 48 start to gradually flow towards stopper 10. Bottle 12 may be inverted, rotated, agitated and/or shaken in a variety of manners, depending on the particular nature of the beverage and desired result, as is well known in the art. In FIG. 4, sediments 48 are settling into receptacle 14.

Figure 5:
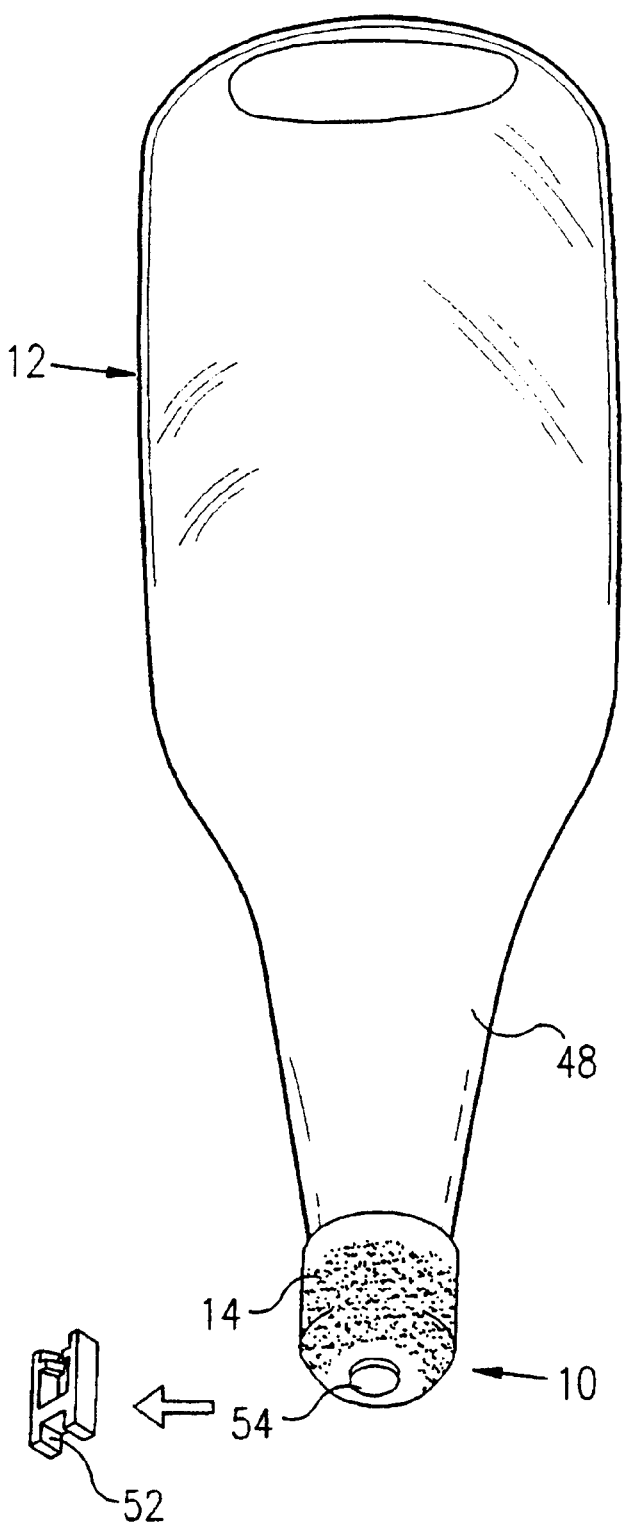
Figure 6:
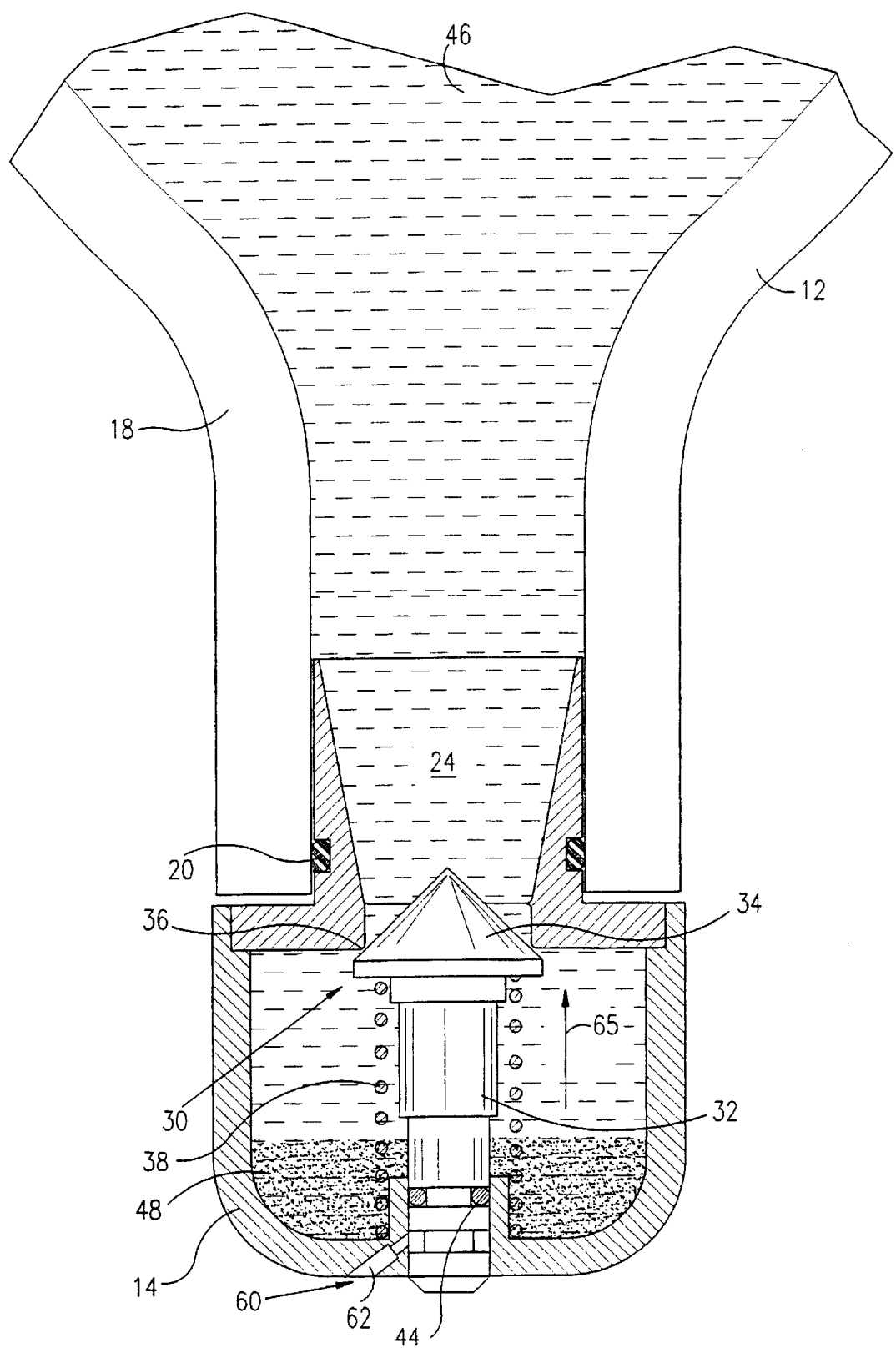

In FIG. 5, keeper 52 is removed from knob 54. As seen in FIG. 6, this causes spring 38 to push end 34 of plunger 32 in the direction of an arrow 65 against valve seat 36, thereby closing valve 30 and sealing receptacle 14. Once end 34 of valve 30 has sealed receptacle 14 from the rest of bottle 12, sediments 48 are trapped inside receptacle 14. After trapping, the sediments may be removed (through another suction aperture not shown), the wine may be subjected to further post-clarification treatments (like sweetening), or the bottle may be shipped in an upright position, etc.

Figure 7:
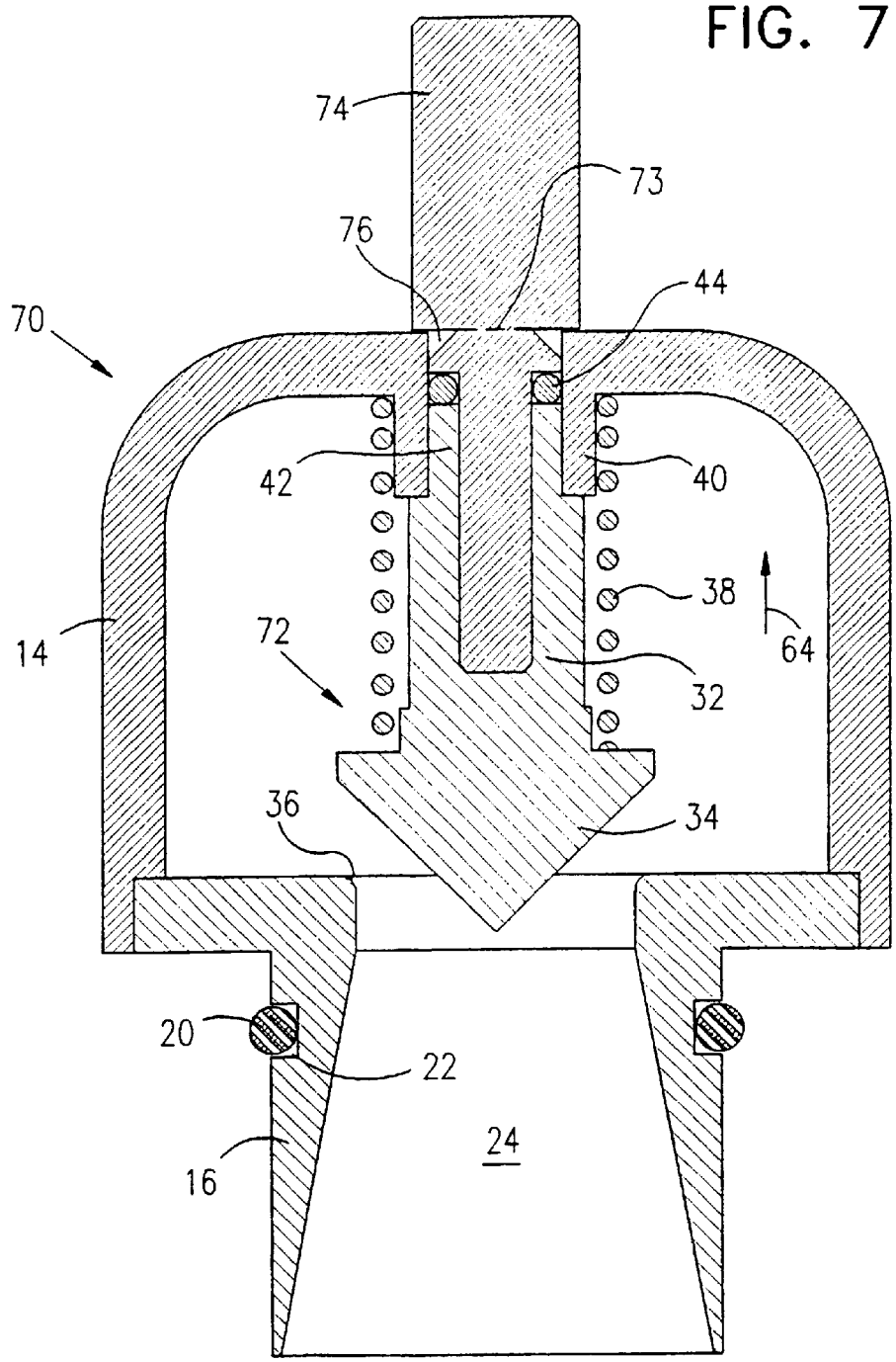
FIG. 7 is a simplified pictorial, partially sectional illustration of sediment collecting apparatus with a one-time valve, constructed and operative in accordance with another preferred embodiment of the present invention.

It is appreciated that stopper 10 and valve 30 may be re-used. Alternatively, stopper 10 and valve 30 may be fashioned for one-time use. Reference is now made to FIG. 7 which illustrates sediment collecting apparatus 70 with a one-time valve 72, constructed and operative in accordance with another preferred embodiment of the present invention. Sediment collecting apparatus 70 is preferably substantially similar to sediment collecting apparatus 5, with like elements being designated by like numerals. In sediment collecting apparatus 70, valve 72 may be fabricated with a knob 74 configured to be broken or sheared off plunger 32, such as along a portion of knob 74 indicated at reference numeral 73, either manually or by using a tool, thereby preventing further use of valve 72. Knob 74 may be fashioned with a neck 76 to facilitate breaking or shearing thereat. It is appreciated that other mechanisms may be used to prevent further use of valve 72, as is known in the art.

Figure 8:
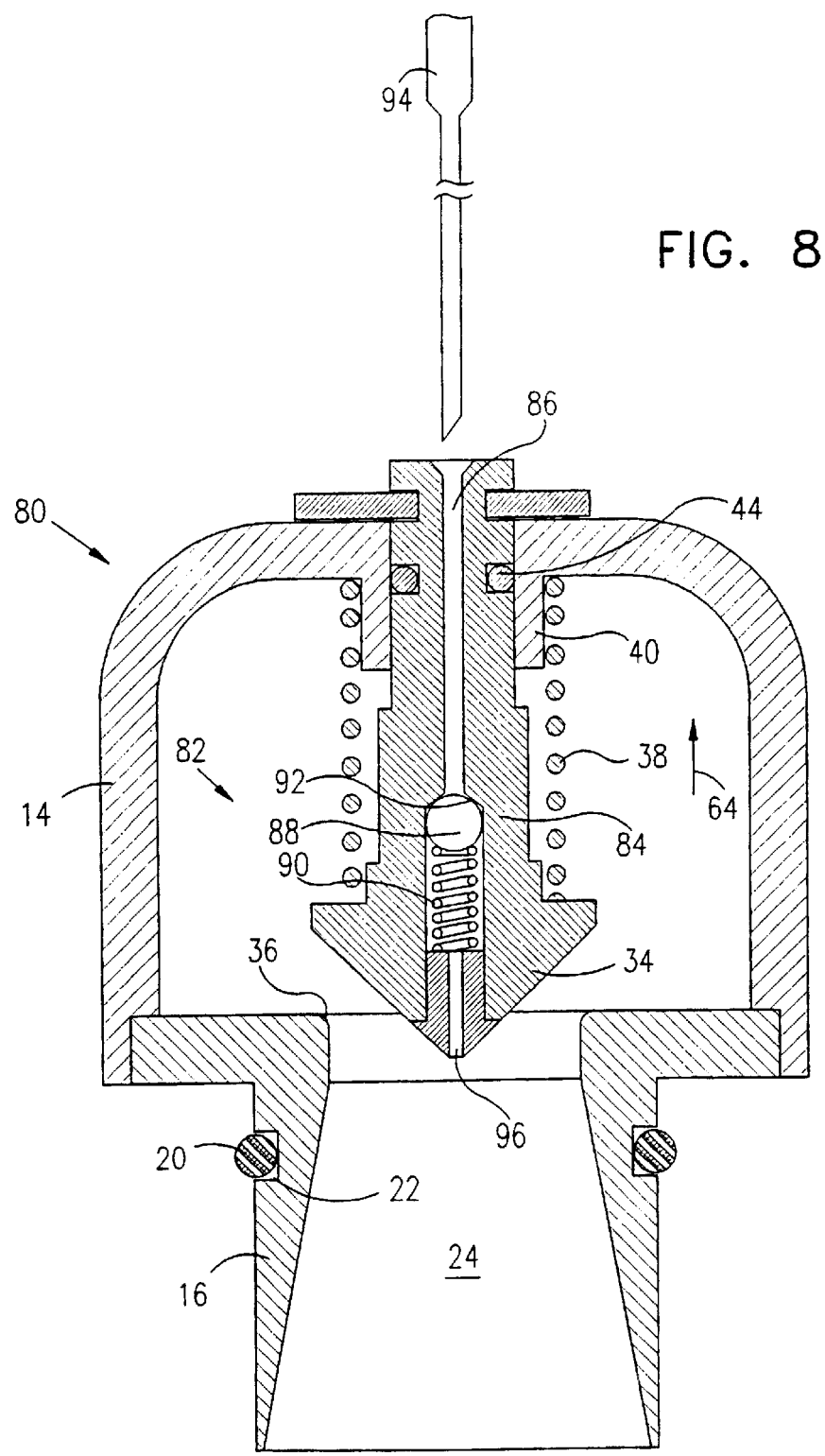
FIG. 8 is a simplified pictorial, partially sectional illustration of sediments collecting apparatus with a passageway for introduction of substances therethrough, constructed and operative in accordance with yet another preferred embodiment of the present invention.

Reference is now made to FIG. 8 which illustrates sediment collecting apparatus 80, constructed and operative in accordance with yet another preferred embodiment of the present invention. Sediment collecting apparatus 80 is preferably substantially similar to sediment collecting apparatus 5, with like elements being designated by like numerals. Sediment collecting apparatus 80 includes a valve 82 that includes a plunger 84 formed with a longitudinal passageway 86 for introduction of substances therethrough. A ball 88 is preferably biased, such as by means of a spring 90, against a valve seat 92 formed along a portion of passageway 86. If it is desired to add substances, such as sweeteners, flavorings or liqueur to the beverage in the bottle, these substances may be conveniently added by means of a syringe 94. A stream of a substance injected by syringe 94 presses ball 88 against spring 90, thereby creating a gap between ball 88 and valve seat 92 and allowing the substance to be introduced through a distal end 96 of passageway 86. The stream of substance is preferably injected at high pressure to overcome both the pressure of spring 90 and the pressure of the fluid that may be applying pressure to distal end 96 of passageway 86. Alternatively, syringe 94 may be fashioned so that a distal end thereof touches and presses ball 88 against spring 90. As another alternative, ball 88 may be elastic and puncturable by syringe 94, wherein ball 88 returns to valve seat 92 after syringe 94 is removed. As a further alternative, syringe 94 may be built into sediment collecting apparatus 80, the syringe containing a pre-determined dose of liqueur or other substance, wherein a user may then inject the predetermined dose into the bottle.

Ball 88 and valve seat 92 thus form an internal valve for controlled passage of substances therethrough, regardless if valve 82, which acts as a main valve, is closed or not.

Figure 9:
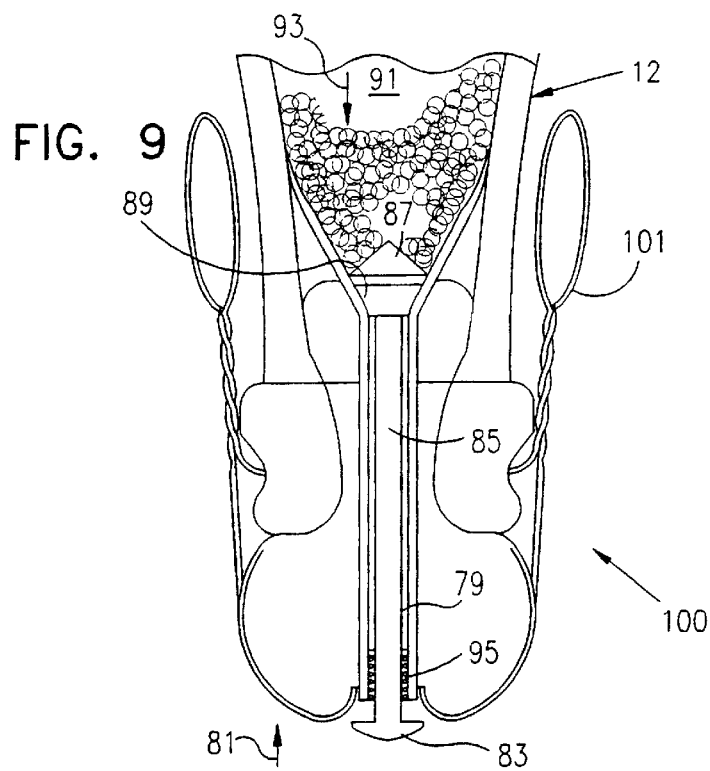
FIGS. 9, 10 and 11 are simplified illustrations of sediment collecting apparatus with wire retainers traditionally used with champagne bottle caps, constructed and operative in accordance with three other preferred embodiments of the present invention.
Figure 10:
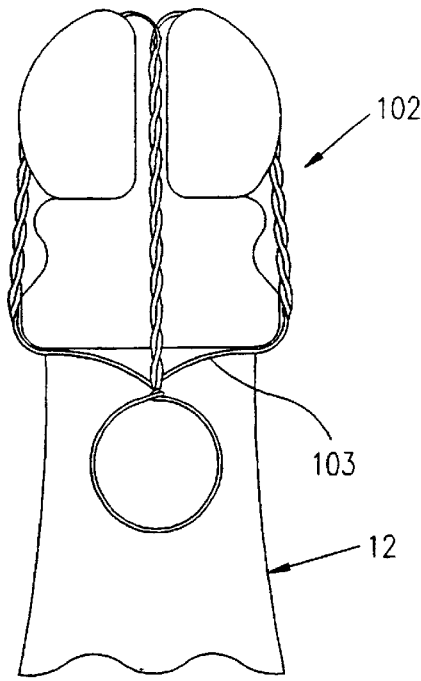
Figure 11:
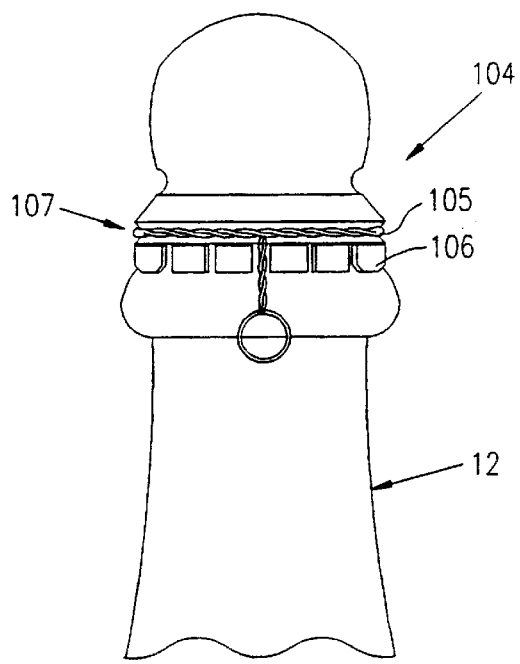

Reference is now made to FIGS. 9, 10 and 11 which illustrate sediment collecting apparatus with wire retainers traditionally used with champagne bottle caps, constructed and operative in accordance with three other preferred embodiments of the present invention. FIG. 9 illustrates sediment collecting apparatus 100 with a wire retainer 101 that is partially wrapped therearound. FIG. 10 illustrates sediment collecting apparatus 102 with a wire retainer 103 that is generally fully wrapped therearound. FIG. 11 illustrates sediment collecting apparatus 104 with a wire retainer 105 plus a ring 106 that both grip apparatus 104 around a neck portion 107 thereof. Ring 106 may be formed of plastic and pushed or pulled on or off apparatus 104. It is appreciated by those skilled in the art that other retaining devices and safety cap or pressure relief devices, traditional and non-traditional, may be optionally employed with any of the stoppers of the present invention. Sediment collecting apparatus 100 of FIG. 9 will be described more in detail hereinbelow after reference to apparatus of FIG. 17. Any of the retainers may be used with any of the stoppers of the present invention.

Figure 12:
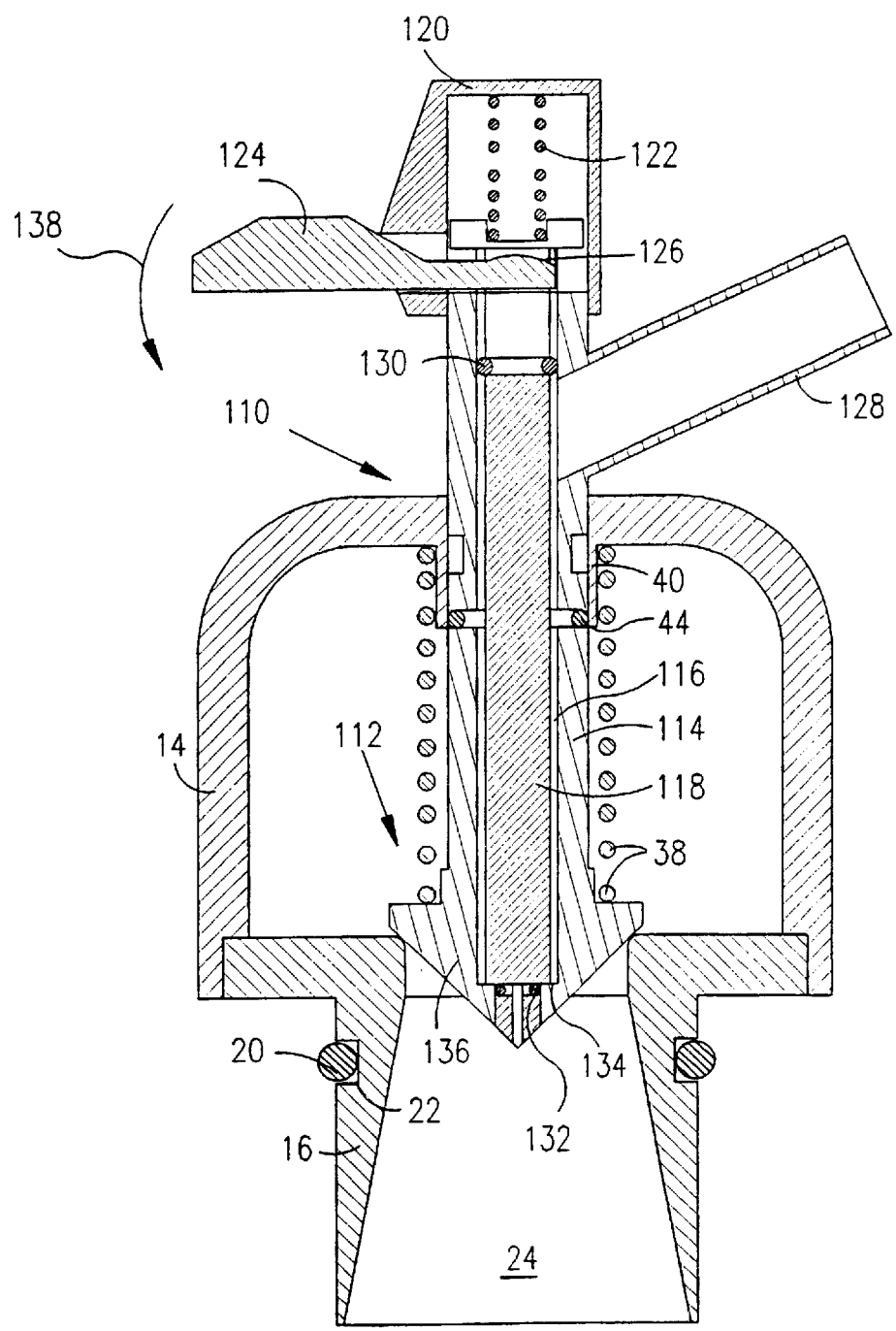
FIG. 12 is a simplified pictorial, partially sectional illustration of sediment collecting apparatus with pouring capability, constructed and operative in accordance with another preferred embodiment of the present invention.

Reference is now made to FIG. 12 which illustrates sediment collecting apparatus 110 with pouring capability, constructed and operative in accordance with another preferred embodiment of the present invention. Sediment collecting apparatus 110 is preferably substantially similar to sediment collecting apparatus 5, with like elements being designated by like numerals. Sediment collection apparatus 110 includes a valve 112 that includes a plunger 114 formed with a longitudinal bore 116 in which is disposed a piston 118 urged away from an endcap 120 by a biasing device, such as a spring 122. A handle 124 preferably grips a notch 126 formed at an end of piston 118 near endcap 120. A spout 128 is preferably formed at an end of plunger 114 just below endcap 120 when in an upright position as illustrated in FIG. 12. Spout 128 is in fluid communication with bore 116. Preferably an O-ring 130 attached to piston 118 slidably seals bore 116 between spout 128 and endcap 120. Another O-ring 132 preferably seals a distal end of piston 118 at a seat 134 formed in an end 136 of plunger 114

By pressing handle 124 generally in the direction of an arrow 138, piston 118 is caused to move towards endcap 120, thereby creating a gap between the distal end of piston 118 and end 136 of plunger 114 and permitting fluid to be poured through bore 116 out spout 128. Piston 118 and endcap 120 thus form an internal valve for controlled passage of fluid therethrough. Piston 118 may be provided, if desired, with an internal syringe receiving aperture (not shown) for receiving a syringe such as described hereinabove with reference to FIG. 8 for syringe 94.

Figure 13:
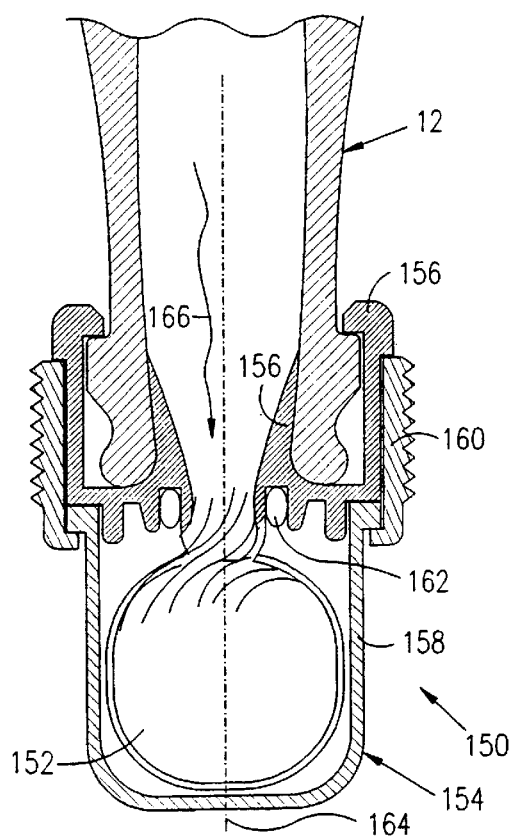
FIGS. 13 and 14 are simplified pictorial, partially sectional illustrations of sediment collecting apparatus with a valve and flexible collection receptacle closeable by turning, constructed and operative in accordance with yet another preferred embodiment of the present invention, respectively before and after closing the collection receptacle.
Figure 14:
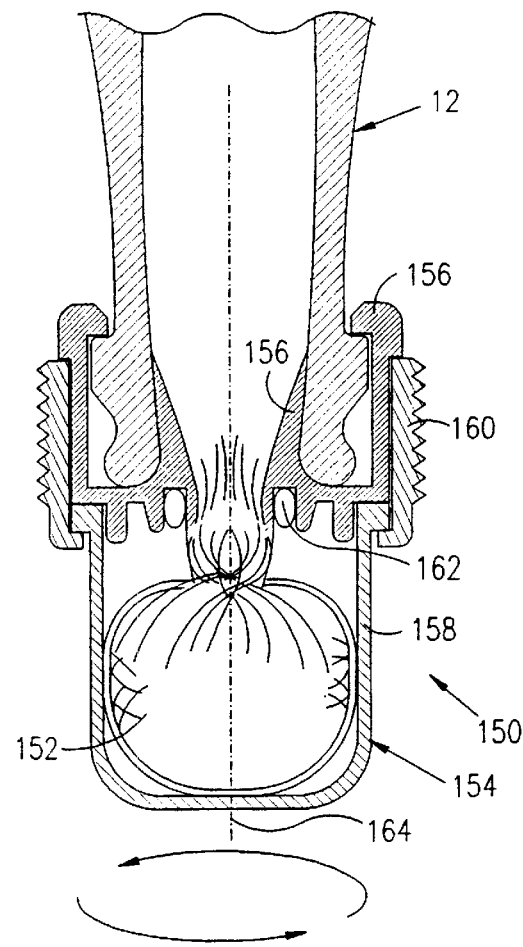

Reference is now made to FIGS. 13 and 14 which illustrate sediment collecting apparatus 150 constructed and operative in accordance with yet another preferred embodiment of the present invention. Apparatus 150 includes a flexible collection receptacle 152 disposed in a stopper 154. Stopper 154 preferably includes a bottle-insertion portion 156, from which flexible collection receptacle 152 extends, and a housing 158. A gripping portion 160 preferably extends from housing 158 and is rotatably attached to bottle-insertion portion 156. An O-ring 162 may be used to "pinch" flexible collection receptacle 152 at its attachment point to bottle-insertion portion 156. Alternatively other suitable devices, such as an external ring, may be used to "pinch" flexible collection receptacle 152. Flexible collection receptacle 152 may be twisted generally about an axis 164.

As seen in FIG. 13, sediments and other matter are free to flow into flexible collection receptacle 152, generally in the direction of an arrow 166. After sediments have been collected in flexible collection receptacle 152, flexible collection receptacle 152 expands and presses against inner walls of housing 158. Housing 158 may then be twisted about axis 164, thereby also twisting flexible collection receptacle 152 which presses thereagainst, and trapping sediments therein, as seen in FIG. 14.

Figure 15:
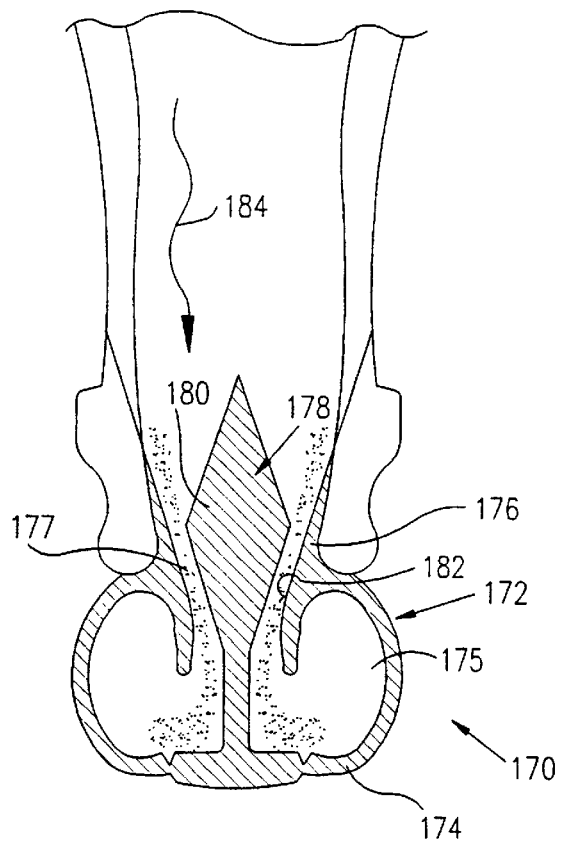
FIGS. 15 and 16 are simplified pictorial, partially sectional illustrations of sediment collecting apparatus with an expandable collection receptacle, constructed and operative in accordance with still another preferred embodiment of the present invention, before and after expansion and closing of the collection receptacle, respectively.
Figure 16:
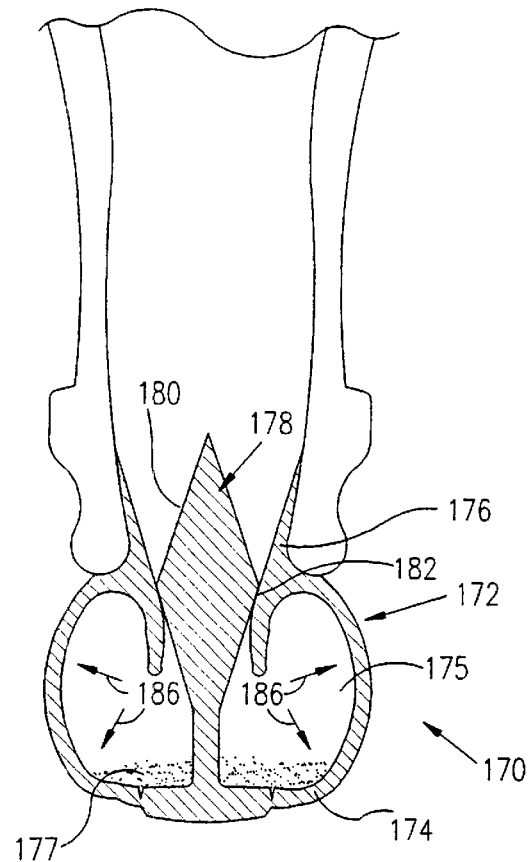

Reference is now made to FIGS. 15 and 16 which illustrate sediment collecting apparatus 170 constructed and operative in accordance with still another preferred embodiment of the present invention. Apparatus 170 includes a stopper 172 formed with a flexible and expandable collection receptacle 174, defining an internal volume 175, and a bottle-insertion portion 176. Expandable collection receptacle 174 is typically formed or molded from a plastic, and may be either integrally formed with or attached to bottle-insertion portion 176. Apparatus 170 also includes a valve 178 that preferably includes a tongue 180 which hangs from expandable collection receptacle 174 and protrudes into and through a mouth 182 of bottle-insertion portion 176.

As seen in FIG. 15, sediments and other matter, as well as fluid, are free to flow into expandable collection receptacle 174, generally in the direction of an arrow 184. As seen in FIG. 16, fluid pressure in expandable collection receptacle 174 causes expandable collection receptacle 174 to expand generally in the direction of arrows 186, thereby causing tongue 180 to abut against mouth 182 and substantially trap sediments and other matter therein.

Figure 17:
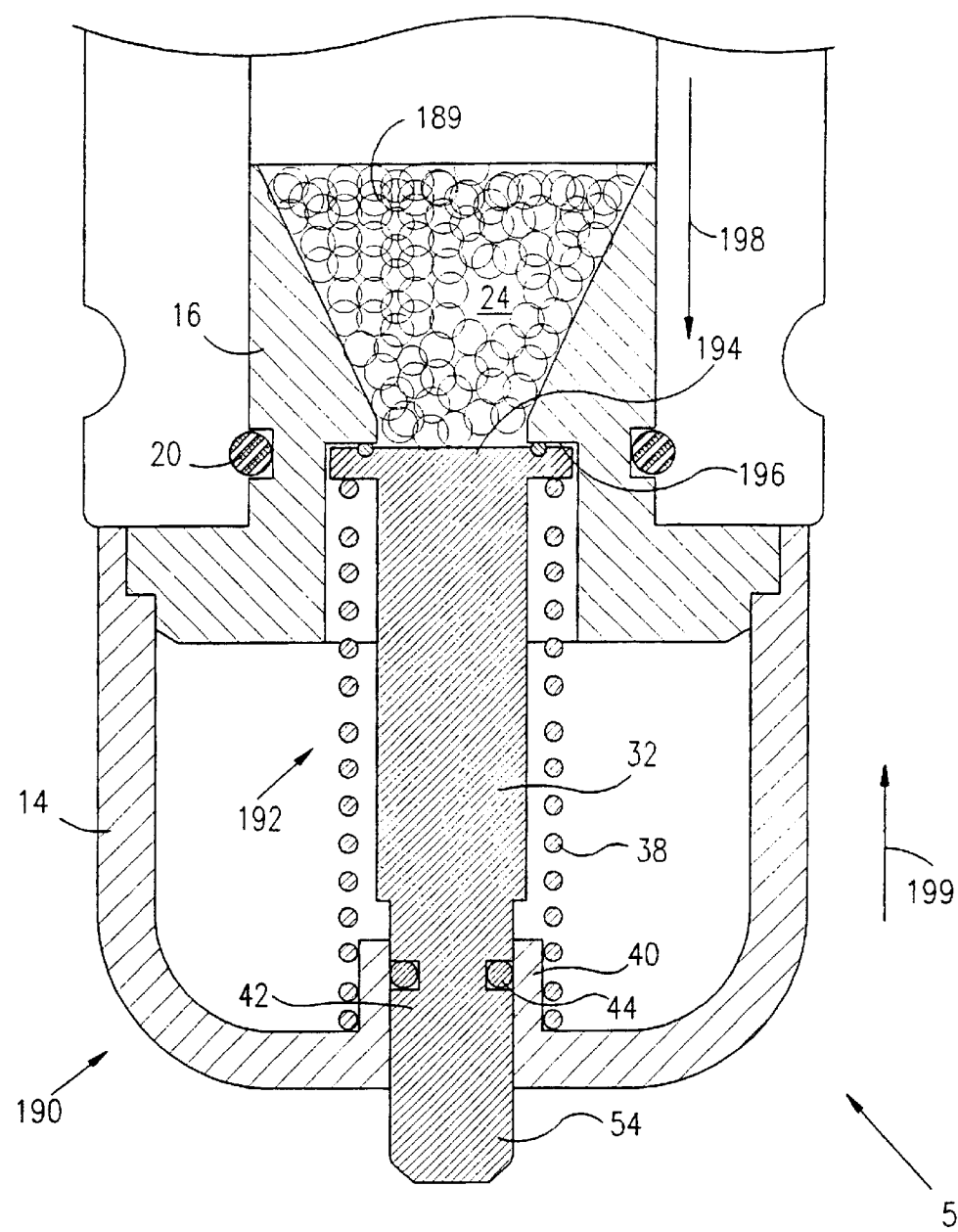
FIG. 17 is a simplified pictorial, partially sectional illustration of sediment collecting apparatus, constructed and operative in accordance with a further preferred embodiment of the present invention, and with an alternative valve arrangement.

Reference is now made to FIG. 17 which illustrates sediment collecting apparatus 190, constructed and operative in accordance with a further preferred embodiment of the present invention. Sediment collecting apparatus 190 is preferably substantially similar to sediment collecting apparatus 5, with like elements being designated by like numerals. Sediment collecting apparatus 190 includes a valve 192 with a generally flat end 194 that seats against a valve seat 196 formed at an end of bore 24 in stem 16. End 194 may alternatively have other shapes other than flat, such as a diamond shaped valve end of valve 178 shown in FIG. 15. Sediments and other matter, designated collectively as numeral 189, may collect in bore 24. Fluid presses against end 194 generally in the direction of an arrow 198. Spring 38 preferably has a strength that permits ingress of sediments and other matter into collection receptacle 14 upon the pressure of the fluid reaching a predetermined threshold. After ingress of sediments into collection receptacle 14, pressure of spring 38 and/or pressure of fluid inside collection receptacle 14 push back against end 194 generally in the direction of an arrow 199 opposite to the sense of arrow 198, thereby causing end 194 to abut against valve seat 196 and substantially trap sediments and other matter in collection receptacle 14.

Referring again to FIG. 9, it is seen that sediment collecting apparatus 100 is another type of sediment collecting apparatus similar to apparatus 190. Sediment collecting apparatus 100 preferably includes a valve 85 with an end 87 that seats against a valve seat 89 formed at an end of a bore 91. Sediments and other matter may collect in the vicinity of bore 91. Fluid presses against end 87 generally in the direction of an arrow 93. Valve 85 is preferably biased by a biasing device, such as a spring 95. Spring 95 preferably has a strength that permits the fluid to press end 87 against valve seat 89 so as to substantially seal the sediments from flowing past end 87. A proximal end 83 of valve 85 may be selectively pushed generally in the direction of an arrow 81 to allow collected sediments to pass through a bore 79 and be expelled from apparatus 100.

Figure 18:
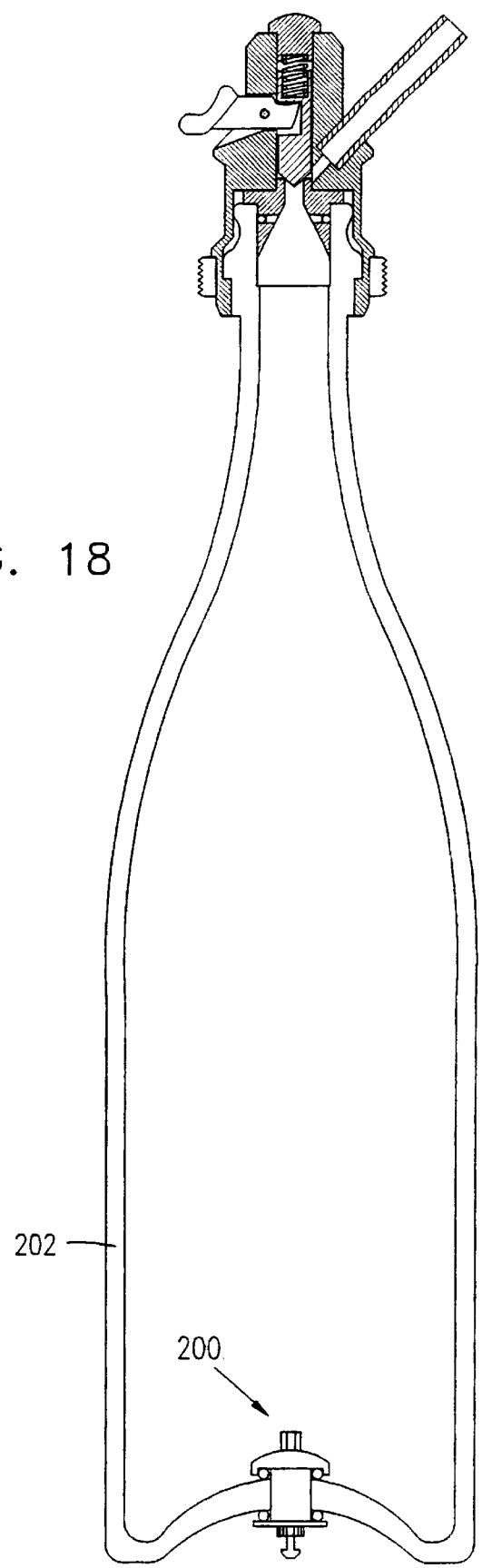
FIG. 18 is a simplified pictorial, partially sectional illustration of sediment collecting apparatus, constructed and operative in accordance with yet a further preferred embodiment of the present invention.

Reference is now made to FIG. 18 which illustrates sediment collecting apparatus 200, constructed and operative in accordance with yet a further preferred embodiment of the present invention. As mentioned hereinabove, the present invention may be carried out with any container suitable for containing therein a beverage, such as a tank or metal container. FIG. 18 illustrates that the stopper of the present invention may be placed at any suitable position of the container, not just at the mouth or neck of a bottle As seen in FIG. 18, apparatus 200 may be placed at the bottom of a bottle 202. Apparatus 200 may be constructed and operate in accordance with any of the embodiments described hereinabove.

Figure 19:
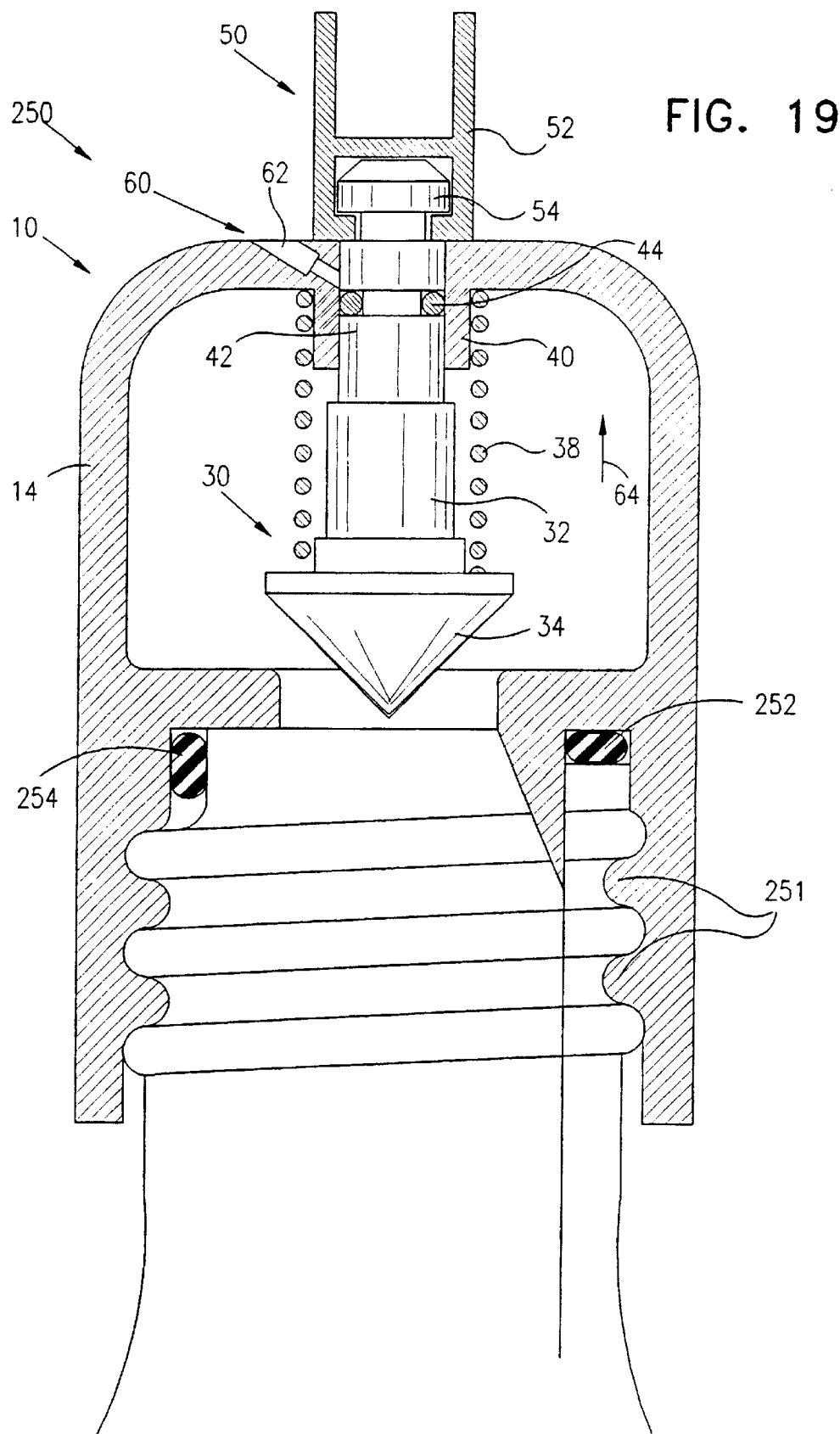
FIG. 19 is a simplified pictorial, partially sectional illustration of sediment collecting apparatus, constructed and operative in accordance with yet another preferred embodiment of the present invention, wherein the apparatus includes a threaded stopper.

Reference is now made to FIG. 19 which illustrates sediment collecting apparatus 250, constructed and operative in accordance with yet another preferred embodiment of the present invention. Sediment collecting apparatus 250 is preferably substantially similar to sediment collecting apparatus 5, with like elements being designated by like numerals. Sediment collecting apparatus 250 differs from sediment collecting apparatus 5 in that stopper 10 is threaded, preferably being provided with male threads 251. Bottle 12 is preferably. correspondingly threaded so that stopper 10 may be screwed onto bottle 12. Seals, such as O-rings 252 and/or 254, may be used to effect a seal between stopper 10 and bottle 12.

Figure 20:
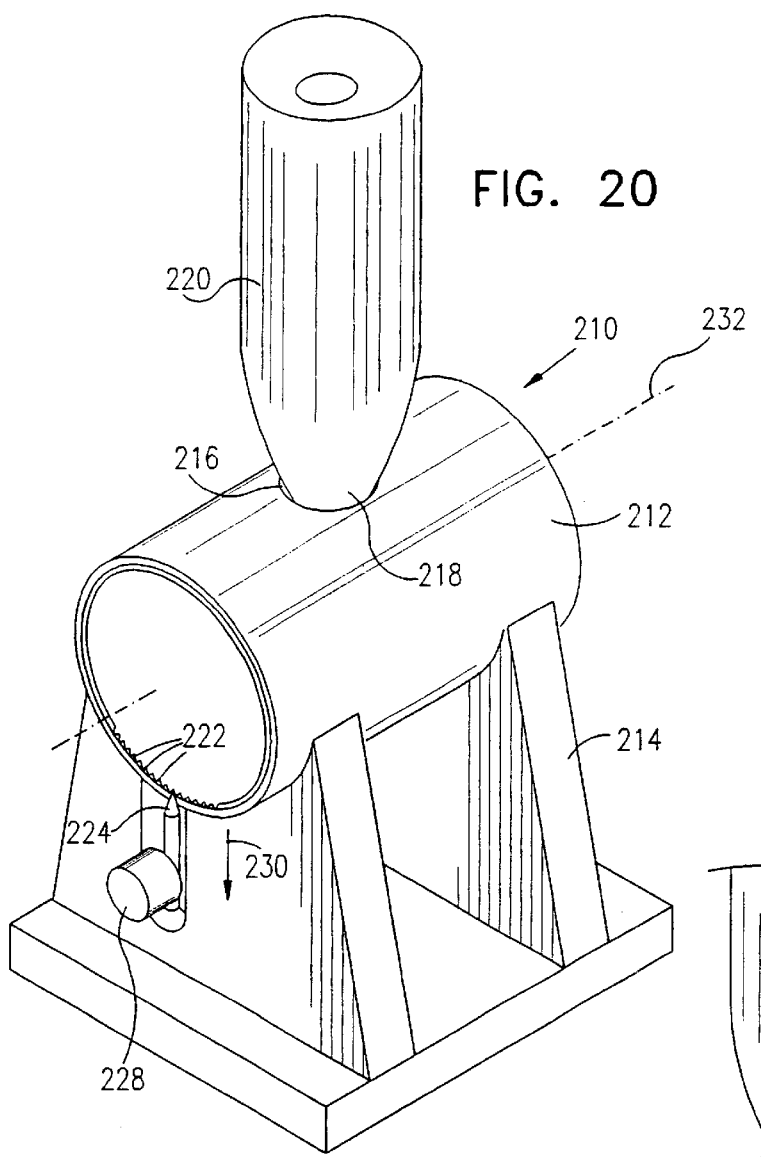
FIGS. 20 and 21 are simplified pictorial and side view illustrations, respectively, of a turning stand constructed and operative in accordance with a preferred embodiment of the present invention, and useful in collecting sediments with any of the sediment collecting apparatus of the present invention.
Figure 21:
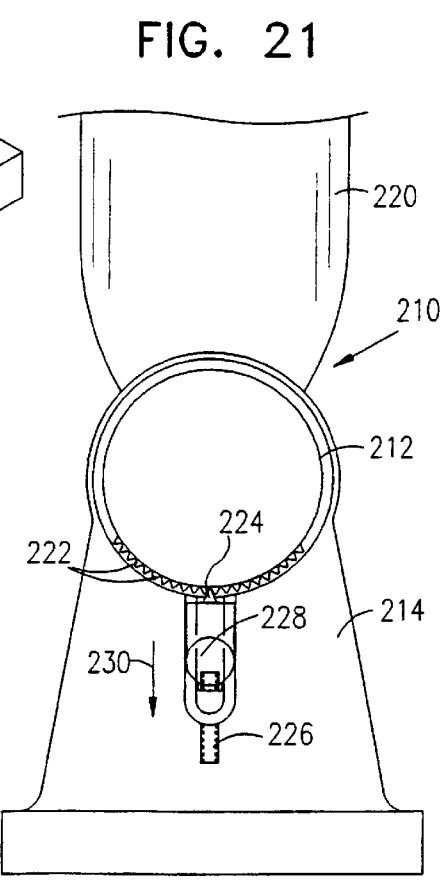

Reference is now made to FIGS. 20 and 21 which illustrate a turning stand 210, constructed and operative in accordance with a preferred embodiment of the present invention, and useful in collecting sediments with any of the sediment collecting apparatus of the present invention. As described hereinabove with reference to FIG. 3, a bottle containing a fermenting beverage may be inverted, rotated, agitated and/or shaken in a variety of manners, depending on the particular nature of the beverage and desired result, as is well known in the art. Turning stand 210 provides a convenient device for turning such a bottle, as is now described.

Turning stand 210 preferably includes a drum 212 arranged for rotation on a supporting base 214. Drum 212 preferably has at least one aperture 216 formed therein for receiving therein a neck portion 218 of a bottle 220.

At least one end of drum 212 is preferably formed with a plurality of teeth 222 which engage a catch 224 located on supporting base 214. Catch 224 is preferably biased against teeth 222 by a biasing device, such as a spring 226 (FIG. 21). A handle 228 is preferably attached to catch 224. Moving handle 228 generally in the direction of an arrow 230 releases catch 224 from teeth 222 and permits drum 212 to be rotated generally about a longitudinal axis 232 (FIG. 20). Thus, bottle 220 may be turned to enhance settling of sediments as described hereinabove. Turning stand 210 may be provided with a timing mechanism (not shown) to effect rotation of a bottle at predetermined intervals. With appropriate gimbals (not shown), turning stand 210 may be constructed to rotate bottles about several different axes of rotation.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

What is claimed is:

1. A stopper comprising:
   a collection receptacle;
   a spring biased valve that permits flow of sediments into said collection receptacle, wherein said valve may be closed to substantially trap said sediments in said collection receptacle and obstruct flow therefrom.

2. The stopper according to claim 1 and further comprising a bottle, wherein said stopper is sealably attachable to said bottle and said sediments flow to said collection receptacle from a fluid in said bottle.

3. The stopper according to claim 1 and further comprising a bottle, wherein said stopper is threadably attachable to said bottle.

4. The stopper according to claim 1 and further comprising a retaining mechanism for releasably retaining said valve in an open configuration that permits flow of sediments into said collection receptacle.

5. The stopper according to claim 1 and further comprising a pressure relief device that relieves an internal pressure from said stopper.

6. The stopper according to claim 2 and further comprising a pressure relief device that relieves an internal pressure from said bottle.

7. The stopper according to claim 1 wherein said valve is selectively returnable from a closed configuration that substantially traps said sediments in said collection receptacle and obstructs flow therefrom, to an open configuration that permits the flow of additional sediments into said collection receptacle.

8. The stopper according to claim 1 and further comprising an expelling device for expelling sediments from said collection receptacle.

9. The stopper according to claim 2 and further comprising an expelling device for expelling sediments from said collection receptacle while said stopper is attached to said bottle.

10. The stopper according to claim 1 and further comprising a stem that extends 30 from said collection receptacle and which is adapted to sealingly fit into an aperture of a bottle, said stem having a bore to permit fluid communication between said contents of said bottle and said collection receptacle.

11. The stopper according to clam 1 and wherein said collection receptacle comprises a flexible portion which may be sealed by twisting thereof.

12. The stopper according to claim 1 and wherein said collection receptacle comprises a portion characterized by a changeable volume and an increase in fluid pressure inside said collection receptacle causes a change in volume of said changeable volume thereby closing said valve.

13. The stopper according to claim 12 and wherein said changeable volume portion comprises an expandable portion which upon expansion closes said valve.

14. The stopper according to claim 1 and wherein said valve is biased by a biasing device against a pressure exerted thereupon by a fluid, and said valve is selectively openable to permit an ingress of said fluid that presses against said valve into said collection receptacle.

15. A stopper comprising:

a collection receptacle; and a stem that extends from said collection receptacle and which in adapted to sealingly fit into an aperture of a bottle, said stem having a bore to permit fluid communication between said contents of said bottle and said collection receptacle, characterized in that said stopper is provided with a valve that permits flow of sediments into said collection receptacle, wherein said valve may be closed to substantially trap said sediments in said collection receptacle and obstruct flow therefrom, and wherein said valve comprises a plunger that biases against a valve seat adjacent to an aperture in said collection receptacle through which the sediments may pass.

16. A stopper comprising:

a collection receptacle; and a stem that extends from said collection receptacle and which is adapted to sealingly fit into an aperture of a bottle, said stem having a bore to permit fluid communication between said contents of said bottle and said collection receptacle, characterized in that said stopper is provided with a valve that permits flow of sediments into said collection receptacle, wherein said valve may be closed to substantially trap said sediments in said collection receptacle and obstruct flow therefrom, and wherein said stem comprises a packing preform for sealing said stem with respect to said aperture of said bottle.

17. A stopper comprising:

a collection receptacle;

characterized in that said stopper is provided with a sediment trapping valve that permits flow of sediments into said collection receptacle, wherein said valve may be closed to substantially trap said sediments in said collection receptacle and obstruct flow therefrom, and wherein said valve comprises an internal valve for selective passage of substances therethrough regardless of whether said sediment trapping valve is closed or not.

18. The stopper according to claim 17 and further comprising a spout, said internal valve being in fluid communication with said spout, and wherein said internal valve may be selectively opened to pour a beverage through said internal valve and said spout.

19. A stopper comprising:

a collection receptacle;

characterized in that said stopper is provided with a valve that permits flow of sediments into said collection receptacle, wherein said valve may be closed to substantially trap said sediments in said collection receptacle and obstruct flow therefrom, and wherein said valve further comprises a device which prevents further use of said valve once said valve has been closed to trap sediments therein.

20. A stopper comprising:

a collection receptacle;

characterized in that said stopper is provided with a sediment trapping valve that permits flow of sediments into said collection receptacle, wherein said valve may be closed to substantially trap said sediments in said collection receptacle and obstruct flow therefrom, and wherein said collection receptacle comprises a portion characterized by a changeable volume and an increase in fluid pressure inside said collection receptacle causes a change in volume of the changeable volume thereby opening said valve.

21. The stopper according to claim 20 and wherein said changeable volume portion comprises an expandable portion which upon expansion opens said valve.

22. A method for separating sediments produced by fermenting of a beverage from a portion of the beverage, the method comprising:

allowing said sediments produced by said fermenting to flow into a collection receptacle access to which is controlled by a spring-biased valve, said receptacle being formed in a stopper that seals a container containing said beverage; and trapping said sediments in said collection receptacle so as to separate said sediments from a portion of said beverage remaining in said container outside of said collection receptacle.

23. A method for producing a beverage comprising:
sealing a fermentable beverage in a container with a stopper, said stopper being formed with a collection receptacle therein, access to which is controlled by a spring-biased valve;
fermenting said fermentable beverage, thereby producing sediments as a byproduct of the fermenting;
allowing said sediments produced by said fermenting to flow into said collection receptacle; and
trapping said sediments in said collection receptacle so as to separate said sediments from a portion of said beverage remaining in said container outside of said collection receptacle.

24. The method according to claim 23 and further comprising allowing said beverage to undergo primary and secondary fermentation, wherein said container is sealed with said stopper during both primary fermentation and secondary fermentation.

25. The method according to claim 22 and further comprising pressure relieving said container upon an internal pressure of said container reaching a predetermined level.

26. The method according to to claim 23 and further comprising pressure relieving said container upon an internal pressure of said container reaching a predetermined level.

27. The method according to claim 24 and further comprising pressure relieving said container upon an internal pressure of said container reaching a predetermined level.

28. A method for separating sediments produced by fermenting of a beverage from a portion of the beverage, the method comprising:
allowing said sediments produced by said fermenting to flow into a collection receptacle formed in a stopper that seals a container containing said beverage;
trapping said sediments in said collection receptacle so as to separate said sediments from a portion of said beverage remaining in said container outside of said collection receptacle; and
pressure relieving said container upon an internal pressure of said container reaching a predetermined level, wherein said predetermined level is in the range of approximately 12–25 atmospheres.

29. A method for producing a beverage comprising:
sealing a fermentable beverage in a container with a stopper, said stopper being formed with a collection receptacle therein;
fermenting said fermentable beverage, thereby producing sediments as a byproduct of the fermenting;
allowing said sediments produced by said fermenting to flow into said collection receptacle;
trapping said sediments in said collection receptacle so as to separate said sediments from a portion of said beverage remaining in said container outside of said collection receptacle; and
pressure relieving said container upon an internal pressure of said container reaching a predetermined level, wherein said predetermined level is in the range of approximately 12–25 atmospheres.

30. A method for producing a beverage comprising:
scaling a fermentable beverage in a container with a stopper, said stopper being formed with a collection receptacle therein;
fermenting said fermentable beverage, thereby producing sediments as a byproduct of the fermenting;
allowing said sediments produced by said fermenting to flow into said collection receptacle;
trapping said sediments in said collection receptacle so as to separate said sediments from a portion of said beverage remaining in said container outside of said collection receptacle;
pressure relieving said container upon an internal pressure of said container reaching a predetermined level, wherein said beverage is allowed to undergo primary and secondary fermentation during both of which said container is sealed with said stopper and wherein said predetermined level is in the range of approximately 12–25 atmospheres.

31. The method according to claim 22 and further comprising adding a substance to said portion of said beverage remaining in said container outside of said collection receptacle.

32. The method according to claim 23 and further comprising adding a substance to said portion of said beverage remaining in said container outside of said collection receptacle.

33. The method according to claim 24 and further comprising adding a substance to said portion of said beverage remaining in said container outside of said collection receptacle between primary and secondary fermentation.

34. The method according to claim 22 and further comprising riddling said container while allowing said sediments produced by said fermenting to flow into said collection receptacle.

35. The method according to claim 23 and further comprising riddling said container while allowing said sediments produced by said fermenting to flow into said collection receptacle.

36. The method according to claim 24 and further comprising riddling said container while allowing said sediments produced by said fermenting to flow into said collection receptacle.

37. The method according to claim 22 and wherein said trapping of said sediments is performed after transporting said container to a location remote from where said beverage was placed in said container.

38. The method according to claim 23 and wherein said trapping of said sediments is performed after transporting said container to a location remote from where said beverage was placed in said container.

39. The method according to claim 24 and wherein said trapping of said sediments is performed after transporting said container to a location remote from where said beverage was placed in said container.

40. Apparatus for manipulating a beverage container, comprising:
a drum having a longitudinal axis and arranged for rotation on a supporting base, said drum having an aperture formed therein for receiving therein a portion of a beverage container, at least one end of said drum being formed with a plurality of teeth which selectively engage a catch located on said supporting base, wherein said catch may be selectively released from said teeth to permit said drum to be rotated generally about said longitudinal axis.

* * * * *